United States Patent [19]
Suzuki et al.

[11] Patent Number: 5,837,800
[45] Date of Patent: Nov. 17, 1998

[54] POLYETHYLENE-2,6-NAPHTHALENE DICARBOXYLATE RESIN AND PREFORM AND BOTTLE MOLDED THEREOF

[75] Inventors: Minoru Suzuki; Kimihiko Sato; Masami Umeda, all of Matsuyama, Japan

[73] Assignee: Teijin Limited, Osaka, Japan

[21] Appl. No.: 16,280

[22] Filed: Jan. 30, 1998

[51] Int. Cl.$^6$ ..................................................... C08G 63/02
[52] U.S. Cl. ............................................. 528/193; 528/190
[58] Field of Search ...................................... 528/190, 193

[56] References Cited

FOREIGN PATENT DOCUMENTS

| | | |
|---|---|---|
| 748440 | 2/1995 | Japan . |
| 7109340 | 4/1995 | Japan . |
| 8092362 | 4/1996 | Japan . |
| 8113632 | 5/1996 | Japan . |
| 9077859 | 3/1997 | Japan . |

*Primary Examiner*—Terressa Mosley
*Attorney, Agent, or Firm*—Sughrue, Mion, Zinn, Macpeak & Seas, PLLC

[57] ABSTRACT

A polyethylene-2,6-naphthalene dicarboxylate resin for molding a bottle, which comprises 2,6-naphthalenedicarboxylic acid as a main acid component and ethylene glycol as a main glycol component and contains a germanium compound as a polycondensation catalyst, and has an intrinsic viscosity of 0.55 to 0.75 dl/g, a terminal carboxyl group content of 32 eq/ton or less, an acetaldehyde content of 8 ppm or less and a diethylene glycol component content of 0.8 to 3.0 wt %.

12 Claims, No Drawings

POLYETHYLENE-2,6-NAPHTHALENE DICARBOXYLATE RESIN AND PREFORM AND BOTTLE MOLDED THEREOF

DETAILED DESCRIPTION OF THE INVENTION

This invention relates to a polyethylene-2,6-naphthalene dicarboxylate resin and to a preform for a bottle and a bottle, which are molded thereof. More specifically, it relates to a polyethylene-2,6-naphthalene dicarboxylate resin which is excellent in hue, transparency, thermal stability and moldability, to a preform for a bottle and to a bottle molded thereof which is excellent in hue, transparency and thermal stability.

Plastic bottles are mainly used as bottles for beverages such as juice, water, beer or the like. Materials for these plastic bottles need to be excellent in hue, transparency, gas barrier properties and flavor retention properties from a viewpoint of increasing commercial product value when a bottle and its contents are seen as a unitary commodity.

For the purpose of saving resources and the like, recycling of plastic bottles, that is, the re-use of bottles has been recently studied. A recycle system for the bottles comprises the step of cleaning a bottle with an alkali at a high temperature. Therefore, the bottle must have a resistance to hydrolysis to stand this step.

Polyethylene-2,6-naphthalene dicarboxylate (may be abbreviated as PEN hereinafter) can be basically produced using the same catalyst as that for polyethylene terephthalate (may be abbreviated as PET hereinafter), but from a viewpoint of hue, germanium dioxide is used as a polymerization catalyst for PEN, in particular.

According to studies conducted by the inventors of the present invention, whitening occurs more readily at the time of blow molding PEN than PET, and a bottle having satisfactory transparency cannot be obtained from PEN with the prior art.

The present inventors have further studied the cause of whitening of a bottle and have found that whitening of a bottle is caused by deposited particles derived from a catalyst contained in a polymer. That is, the deposited particles derived from a catalyst induce crystallization and increase internal haze. Particularly, in the case of PEN, stress at the time of molding (stretching) a bottle is larger compared with PET and hence, the influence of crystallization largely results.

Therefore, to suppress the whitening of a bottle, the amount of a deposit derived from a catalyst or the like must be reduced.

There is proposed a method for reducing the deposit, in which a specific catalyst is used in a specific amount and a specific ratio. It is for sure that the transparency of PEN is improved by this method.

However, even with this method, PEN having satisfactory hue and thermal stability could not be obtained. It has been found that the reason for this is that the decomposition rate of a polymer becomes high when the polymer is melt molded because the catalyst is not deactivated completely due to a small amount of a phosphorus compound added which is used to deactivate the ester exchange catalyst so as to suppress the production of a deposit in the prior art.

It has been also revealed that when the melt viscosity of the polymer is not appropriate at the time of melt molding PEN, such problems arise that the resulting bottle cannot have a smooth surface and uniform thickness or a haze generates due to an extreme deterioration of its haze value or a large amount of acetaldehyde is regenerated.

When the amount of acetaldehyde contained in the raw material polymer is large in addition to the amount of regenerated acetaldehyde at the time of molding, the amount of acetaldehyde contained in a preform and a bottle is increased consequently, whereby an offensive odor derived from acetaldehyde is generated from the contents of the bottle.

Since PEN has low impact strength, a PEN bottle is easily cracked or delaminated when dropped.

JP-A 7-48440 (the term "JP-A" as used herein means an "unexamined published Japanese patent application") discloses a process for producing an aromatic polyester as a raw material for providing a film having excellent surface flatness and resistance to dry heat deterioration. In this method, a magnesium compound, calcium compound, germanium compound and phosphorus compound are added to a reaction system in amounts that satisfy the following expressions (11) to (14) before a polymerization reaction goes to completion:

$$2.1 \leq (Mg+Ca) \leq 5.1 \tag{11}$$

$$1.0 \leq Mg/Ca \leq 6.0 \tag{12}$$

$$1.6 \leq (Mg+Ca)/P \leq 7.0 \tag{13}$$

$$0 \leq Ge \leq 1.5 \tag{14}$$

wherein Mg, Ca, Ge and P indicate the numbers of moles of element magnesium, element calcium, element germanium and element phosphorus, based on $10^6$ g of an aromatic dicarboxylic acid component constituting the aromatic polyester, respectively.

JP-A 7-109340 discloses a polyethylene naphthalene dicarboxylate composition which contains magnesium, calcium, phosphorus and germanium compounds in amounts that satisfy the following expressions (21) to (24):

$$2.6 \leq (Mg+Ca) \leq 4.1 \tag{21}$$

$$1.3 \leq Mg/Ca \leq 6.0 \tag{22}$$

$$1.0 \leq P/(Mg+Ca) \leq 1.5 \tag{23}$$

$$1.0 \leq Ge \leq 3.0 \tag{24}$$

wherein Mg, Ca, P and Ge are the same as defined in the above expressions (11) to (14), and an ammonium compound represented by the following formula (25) in an amount of 0.04 to 0.4 mole based on $10^6$ g of an acid component constituting the polyester:

$$(R^1R^2R^3R^4N^+)A^{3-} \tag{25}$$

wherein $R^1$, $R^2$, $R^3$ and $R^4$ are each a hydrogen atom, an alkyl group, a cycloalkyl group, an aryl group or a derivative group thereof or $R^3$ and $R^4$ may form a ring, and $A^-$ is a residual anion group.

JP-A 8-113632 discloses polyethylene naphthalene dicarboxylate for a bottle, which contains magnesium, calcium, phosphorus and germanium compounds in amounts that satisfy the following expressions (31) to (34):

$$2.6 \leq Mg+Ca \leq 6.0 \tag{31}$$

$$1.3 \leq Mg/Ca \leq 6.0 \tag{32}$$

$$1.0 \leq P/(Mg+Ca) \leq 1.5 \tag{33}$$

$$1.0 \leq Ge \leq 3.0 \tag{34}$$

wherein Mg, Ca, P and Ge are the same as defined in the above expressions (11) to (14), and a phosphonium compound represented by the following formula (35) in an amount of 0.03 to 0.5 mole, based on $10^6$ g of an acid component constituting the polyester:

$$(R^1R^2R^3R^4P^+)A- \qquad (35)$$

wherein $R^1$, $R^2$, $R^3$, $R^4$ and $A^-$ are the same as defined in the above formula (25).

JP-A 8-92362 discloses polyethylene naphthalene dicarboxylate for a bottle, which contains magnesium, calcium, phosphorus, germanium and cobalt compounds in amounts that satisfy the above expressions (31), (32) and (34) and the following expressions (41) and (42):

$$0.1 \leq Co \leq 0.4 \qquad (41)$$

$$1.0 \leq P/Co+Mg+Ca \leq 1.5 \qquad (42)$$

wherein P, Mg and Ca are the same as defined in the above expressions (11) to (13) and Co indicates the number of moles of element cobalt, based on $10^6$ g of a dicarboxylic acid component constituting the polyester, and an ammonium compound represented by the above formula (25) in an amount of 0.04 to 0.4 mole, based on $10^6$ g of an acid component constituting the polyester.

Further, JP-A 9-77859 discloses polyethylene naphthalene dicarboxylate for a bottle, which contains cobalt, magnesium, calcium, phosphorus and germanium compounds in amounts that satisfy the following expressions (51) to (55):

$$0.05 \leq Co \leq 0.40 \qquad (51)$$

$$2.0 \leq Mg+Ca \leq 6.0 \qquad (52)$$

$$1.3 \leq Mg/Ca \leq 6.0 \qquad (53)$$

$$1.0 \leq P/(Co+Mg+Ca) \leq 1.5 \qquad (54)$$

$$1.0 \leq Ge \leq 3.0 \qquad (55)$$

and further an ammonium compound having an intrinsic viscosity, measured at 35° C. in a mixed solvent consisting of 3 parts by weight of phenol and 2 parts by weight of tetrachloroethane, in the range of 0.60 to 0.80 dl/g and represented by the above formula (25) in an amount of 0.04 to 0.4 mole, based on $10^6$ g of an acid component constituting the polyester as required.

However, the polyesters disclosed by the above prior arts are not all satisfactory as a raw material for a bottle.

It is therefore an object of the present invention to provide polyethylene-2,6-naphthalene dicarboxylate for molding a bottle which is of high grade and excellent in hue, transparency, thermal stability and moldability.

It is another object of the present invention to provide a preform for a bottle and a bottle which are formed from the above polyethylene-2,6-naphthalene dicarboxylate of the present invention.

It is a further object of the present invention to provide a bottle which can be recycled as it is and retains hue and transparency even after dozens of recycle uses.

Other objects and advantages of the present invention will become apparent from the following description.

According to the present invention, firstly, the above objects and advantages of the present invention can be attained by a polyethylene-2,6-naphthalene dicarboxylate resin for molding a bottle which comprises 2,6-naphthalenedicarboxylic acid as a main acid component and ethylene glycol as a main glycol component and contains a germanium compound as a polycondensation catalyst, has an intrinsic viscosity of 0.55 to 0.75 dl/g, a terminal carboxyl group content of 32 eq/ton or less, an acetaldehyde content of 8 ppm or less and a diethylene glycol component content of 0.8 to 3.0 wt %.

The polyethylene-2,6-naphthalene dicarboxylate of the present invention is a polyester comprising 2,6-naphthalenedicarboxylic acid as a main acid component and ethylene glycol as a main glycol component.

The 2,6-naphthalenedicarboxylic acid as a main acid component is preferably contained in an amount of 70 mol % or more, preferably 80 mol % or more, particularly preferably 85 mol % or more, based on the total of all dicarboxylic acid components.

A subsidiary acid component other than the 2,6-naphthalenedicarboxylic acid can be preferably contained in an amount of less than 30 mol %, more preferably less than 20 mol %, particularly preferably less than 15 mol %, of the total of all dicarboxylic acid components.

Specific examples of the subsidiary acid component other than 2,6-naphthalenedicarboxylic acid include 2,7-naphthalenedicarboxylic acid, 1,5-naphthalenedicarboxylic acid, 1,7-naphthalenedicarboxylic acid and other isomers of naphthalenedicarboxylic acid; aromatic dicarboxylic acids such as terephthalic acid, isophthalic acid, diphenyldicarboxylic acid, diphenoxyethanedicarboxylic acid, diphenyletherdicarboxylic acid and diphenylsulfonedicarboxylic acid; alicyclic dicarboxylic acids such as hexahydroterephthalic acid and hexahydroisophthalic acid; aliphatic dicarboxylic acids such as adipic acid, sebacic acid and azelaic acid; and the like. These dicarboxylic acid components may be used alone or in combination of two or more.

Ethylene glycol as a main glycol component is preferably contained in an amount of 70 mol % or more, more preferably 80 mol % or more, particularly preferably 85 mol % or more, based on the total of all glycol components.

A subsidiary glycol component other than ethylene glycol can be preferably contained in an amount of less than 30 mol %, more preferably less than 20 mol %, particularly preferably less than 15 mol %, of the total of all glycol components.

Specific examples of the subsidiary glycol component other than ethylene glycol include trimethylene glycol, tetramethylene glycol, hexamethylene glycol, decamethylene glycol, neopentyl glycol, diethylene glycol, 1,1-cyclohexane dimethanol, 1,4-cyclohexane dimethanol; 2,2-bis(4'-β-hydroxyphenyl)propane; bis(4'-β-hydroxyethoxyphenyl)sulfone, and the like. These glycol components may be used alone or in combination of two or more.

An oxyacid such as p-β-hydroxyethoxybenzoic acid or ε-oxycaproic acid may be used in place of all or part of the above subsidiary dicarboxylic acids.

As a copolymerizable component constituting a copolymer in the present invention, a polyfunctional compound can be further used in such an amount that the copolymer is substantially linear, for example, 2 mol % or less based on the total of the whole acid component. Specific examples of the polyfunctional compound include polycarboxylic acids and polyhydroxy compounds having 3 or more functional groups, such as trimellitic acid and pentaerythritol.

The polyethylene-2,6-naphthalene dicarboxylate of the present invention includes not only a homopolymer but also a copolymer, as described above.

The polyethylene-2,6-naphthalene dicarboxylate of the present invention has an intrinsic viscosity of 0.55 to 0.75 dl/g.

When the intrinsic viscosity is smaller than 0.55 dl/g, the polymer is liable to be crystallized and whitened in molding it into a preform or a bottle. In addition, due to its too low melt viscosity, its blow moldability is poor, thereby causing the decentering and nonuniform thickness of a bottle. On the other hand, when the intrinsic viscosity is larger than 0.75 dl/g, a molding failure occurs at the time when it is molded into a preform at a normal molding temperature, or the amount of acetaldehyde produced by heat generated by shearing increases, thereby causing a great reduction of intrinsic viscosity. The intrinsic viscosity is preferably 0.58 to 0.73 dl/g.

The polyethylene-2,6-naphthalene dicarboxylate of the present invention must contain terminal carboxyl groups in the polymer in an amount of 32 eq/ton or less. When the amount is more than 32 eq/ton, hydrolysis is accelerated during washing with an alkali, thereby reducing the strength of the resulting bottle or degrading the outer appearance including a decrease in transparency.

The amount of terminal carboxyl groups is preferably 30 eq/ton or less, more preferably 2 to 30 eq/ton.

The polyethylene-2,6-naphthalene dicarboxylate of the present invention must have an acetaldehyde content in the polymer of 8 ppm or less. When the content is more than 8 ppm, the total amount of acetaldehyde generated by melt molding and acetaldehyde present before molding becomes excessive in the resulting preform or bottle, thereby giving an offensive odor to its contents. The content of acetaldehyde is preferably 6 ppm or less, more preferably 0 to 5 ppm.

The polyethylene-2,6-naphthalene dicarboxylate of the present invention must have a diethylene glycol content in the polymer of 0.8 to 3.0 wt %. If the content is less than 0.8 wt %, the transparency is deteriorated and the strength of the resulting bottle is reduced by the acceleration of crystallization. When the content is more than 3.0 wt %, thermal stability is lowered by thermal decomposition. The content of a diethylene glycol component is preferably 1.0 to 2.8 wt %, more preferably 1.2 to 2.5 wt %.

The polyethylene-2,6-naphthalene dicarboxylate of the present invention preferably has a b value in the range of +0.6 to −6.0, more preferably 0 to −5.0.

The polyethylene-2,6-naphthalene dicarboxylate of the present invention can be produced by melt polycondensation using a cobalt compound, magnesium compound and calcium compound as ester exchange catalysts and a germanium compound as a polycondensation catalyst. A phosphorus compound is preferably used as a stabilizer.

Therefore, the polyethylene-2,6-naphthalene dicarboxylate of the present invention preferably contains a cobalt compound, magnesium compound, calcium compound and phosphorus compound in amounts that satisfy the following expressions:

$$0.12 \leq Co \leq 1.2 \quad (1)$$

$$2.0 \leq Mg+Ca \leq 6.0 \quad (2)$$

$$1.3 \leq Mg/Ca \leq 6.0 \quad (3)$$

$$1.0 \leq P/(Co+Mg+Ca) \leq 1.5 \quad (4)$$

$$1.0 \leq Ge \leq 3.0 \quad (5)$$

wherein Co, Mg, Ca, P and Ge indicate the number of moles of cobalt atoms in the cobalt compound, the number of moles of magnesium atoms in the magnesium compound, the number of moles of calcium atoms in the calcium compound, the number of moles of phosphorus atoms in the phosphorus compound and the number of moles of germanium atoms in the germanium compound, based on 1 ton of acid components constituting the polymer, respectively.

The cobalt compound functions as an ester exchange reaction catalyst and besides, suppresses yellowing which causes degradation of the hue of the polymer. When the amount of the cobalt compound added is less than 0.12 mole, the effect on improvement of hue can be hardly expected, and when the amount is more than 1.2 moles, the hue of the polymer degrades, that it, the polymer becomes gray and transparency is deteriorated by deposition.

The content of the cobalt compound preferably satisfies the following expression:

$$0.41 \leq Co \leq 1.2 \quad (1)'$$

wherein Co is the same as defined in the above expression (1).

When the total amount of the calcium compound and the magnesium compound is more than 6.0 moles, the resulting preform or bottle is whitened by deposited particles derived from the residual catalysts during molding, whereby the transparency of the bottle is impaired. On the other hand, when the total amount is less than 2.0 moles, disadvantageously, an ester exchange reaction becomes insufficient and the subsequent polymerization reaction becomes slow.

The molar ratio of the magnesium compound to the calcium compound is in a range of 1.3 to 6.0. If the molar ratio is more than 6.0 or less than 1.3, the deposition of particles derived from the residual catalysts occurs, the resulting preform or bottle is whitened when it is molded, and the transparency of the bottle is impaired.

Further, to deactivate the ester exchange catalyst, it is preferable that the amount of the phosphorus compound to be added as a stabilizer is in a molar ratio of 1.0 to 1.5, based on the total of the cobalt compound, calcium compound and magnesium compound. When the molar ratio is less than 1.0, the ester exchange catalyst is not deactivated completely and the thermal stability of the polymer is poor, whereby the polymer is colored or its physical properties in the molding deteriorate. On the other hand, when the molar ratio is more than 1.5, the thermal stability of the polymer also lowers.

The cobalt compound, calcium compound and magnesium compound used in the present invention can be used, for example, as oxides, chlorides, carbonates or carboxylates. Out of these, acetates, i.e., cobalt acetate, calcium acetate and magnesium acetate are preferred.

Specific examples of the phosphorus compound include organic phosphoric acids and inorganic phosphoric acids. Organic phosphoric acids are phosphoric acid esters such as trimethyl phosphate, triethylene phosphate or tri-n-butyl phosphate. Inorganic phosphoric acids are hypophosphorous acid, phosphorous acid or orthophosphoric acid.

In the present invention, the germanium compound is used as a polymerization catalyst. From a viewpoint of hue, germanium dioxide is preferably used as the germanium compound. Particularly, so-called amorphous germanium dioxide having no crystal form is preferred. When this amorphous germanium dioxide is used, the amount of deposited particles in the polymer is smaller as compared with the case where an ordinary crystalline germanium dioxide is used. Therefore, a polymer having a higher transparency can be obtained.

The amount of the germanium compound added is preferably in the range of 1.0 to 3.0 moles. When the amount is smaller than 1.0 mole, polymerization reactivity lowers with the result of low productivity, while when the amount is larger than 3.0 moles, a polymer having poor thermal stability is obtained with the result that physical properties and hue are liable to deteriorate at the time of molding.

As for the time for adding the above catalysts, all of the cobalt compound, calcium compound and magnesium compound are preferably added during from the start of the ester exchange reaction up to the initial stage thereof.

Meanwhile, the phosphorus compound can be added after the ester exchange reaction is substantially completed and before intrinsic viscosity reaches 0.3. The germanium compound is preferably added 10 minutes or more before the phosphorus compound is added and before intrinsic viscosity reaches 0.2.

The polyethylene-2,6-naphthalene dicarboxylate of the present invention has an intrinsic viscosity of 0.55 to 0.75 dl/g as described above. The intrinsic viscosity is preferably increased to a desired value by solid-state polymerization in accordance with a commonly used method after melt polymerization. In this case, the intrinsic viscosity $[\eta]$ of a prepolymer obtained by the melt polymerization preferably satisfies the following expression.

$$0.40 \leq [\eta] \leq 0.60$$

When the intrinsic viscosity is smaller than 0.40 dl/g, the prepolymer is liable to crack when it is fabricated into chips, while when the intrinsic viscosity is larger than 0.60 dl/g, polymerization takes a long time with the result of degradation in hue.

The polyethylene-2,6-naphthalene dicarboxylate of the present invention obtained by the solid-state polymerization of the prepolymer as described above preferably has an acetaldehyde content of 5 ppm or less and a b value of +0.6 to −6.0

The polyethylene-2,5-naphthalene dicarboxylate of the present invention can be molded into a bottle by any known molding methods such as injection blow molding, biaxial orientation stretch-blow molding, extrusion blow molding and the like.

As a typical example of the biaxial orientation stretch-blow molding, a polymer is first formed into a hollow cylindrical and bottomed preform having an appropriate shape (amorphous molded product) (having a length of 15 cm, an inner diameter of 2 cm and an outer diameter of 2.5 cm, for example). This preform is preheated at a temperature higher than the glass transition point (Tg) of the polymer and the surface area of a body portion of the container is stretched to about 1.5 to 16 times by blowing. In this case, the heat treatment of the container can be appropriately carried out according to circumstances.

The amount of acetaldehyde contained in the obtained preform or bottle is preferably 40 ppm or less. When the amount is more than 40 ppm, disadvantageously, the flavor of the contents of the bottle is worsened by an odor ascribed to acetaldehyde eluted into the contents of the bottle.

The transparency of the obtained bottle is preferably 5% or less in terms of the bottle haze. When the haze is more than 5%, the transparency of the bottle is poor, which is not preferred from a viewpoint of outer appearance.

As described above, it is understood that a preform for a bottle and a bottle, which are molded of the polyethylene-2,6-naphthalene dicarboxylate of the present invention, are also objects the present invention is directed to.

Since the bottle of the present invention is excellent is transparency and outer appearance, it can be used for various applications. For example, it can be used as a container for seasonings, oil, liquors, cosmetics, detergents, refreshing beverages, carbonated beverages, juice, water and beer. It is particularly useful as a container (bottle) to be recycled.

The following examples are given to further illustrate the present invention. "Parts" in the examples means "parts by weight". Physical properties were measured in accordance with the following methods.

(1) intrinsic viscosity $[\eta]$ (IV):

This was calculated from a measurement value at 35° C. using a mixed solvent of tetrachloroethane and phenol (4:6).

(2) Col-L, a, b (hue):

The polymer was heated at 160° C. for 90 minutes in a dryer to be crystallized and then measured by a color machine (model CM-7500 manufactured by Color Machine Co., Ltd.).

(3) haze:

The polymer was dried at 160° C. for 5 hours and molded into a preform having a weight of 63 g at a molding temperature of 305° C. at a molding cycle of 40 seconds using an injection molding machine (100DM manufactured by Meiki Seisakusho Co., Ltd.). The preform was formed into a bottle having an inner volume of 1.0 liter and a body thickness of 400 μm by a blow molding. The haze of the body portion of this bottle was measured by a turbidimeter of Nippon Denshoku Kogyo Co., Ltd.

(4) amount of acetaldehyde:

The sample was frozen, ground and measured by the HS-GC (head space gas chromatography) of Hitachi Ltd. As for the amount of acetaldehyde of the bottle, a mouth portion of the bottle prepared in (3) was measured as the sample.

(5) number of terminal carboxyl groups

The sample was dissolved in benzyl alcohol and titrated using caustic soda and phenol red as an indicator.

(6) impact resistance test

The sample bottle prepared in (3) was used. The bottle was filled with 4 vol. of carbonated water and dropped onto a concrete floor from a height of 1 m. The number of broken bottles out of 10 bottles is counted.

(7) alkali resistance test

The sample bottle prepared in (3) was used. After treated with a 3% NaOH aqueous solution at 85° C. for 6 hours, the sample bottle was measured for a change in the weight, and an impact resistance test described in the above (6) was carried out.

EXAMPLE 1

100 Parts of dimethyl 2,6-naphthalenedicarboxylate and 51 parts of ethylene glycol (abbreviated as EG) were subjected to an ester exchange reaction in accordance with a commonly used method, using 0.005 part (0.02 mmol) of cobalt acetate tetrahydrate, 0.014 part (0.08 mmol) of calcium acetate monohydrate and 0.044 part (0.2 mmol) of magnesium acetate tetrahydrate as ester exchange catalysts. 1.6 Parts (0.16 mmol) of a 1% EG solution of amorphous germanium dioxide was added, and then 0.048 part (0.34 mmol) of trimethyl phosphate was added to complete the ester exchange reaction.

Thereafter, a polycondensation reaction was carried out under conditions of a high temperature and a high vacuum pressure in accordance with a commonly used method, and then the reaction product was formed into strand-like chips. The intrinsic viscosity of the obtained prepolymer was 0.5 dl/g and the polymerization time was 70 minutes. This prepolymer was further polymerized in a solid state in accordance with a commonly used method. The obtained polymer had an intrinsic viscosity of 0.65 dl/g and contained acetaldehyde in an amount of 4 ppm, terminal carboxyl groups in an amount of 25 eq/ton and diethylene glycol in an amount of 1.4 wt %.

EXAMPLES 2 TO 4 AND COMPARATIVE EXAMPLES 1 to 3

Polymers were obtained in the same manner as in Example 1 except that the amounts and ratio of cobalt acetate tetrahydrate, magnesium acetate tetrahydrate, calcium acetate monohydrate, trimethyl phosphate and germanium dioxide were changed as shown in Table 1. The qualities and evaluation results of the obtained polymers are also shown in Tables 1 and 2.

acetate tetrahydrate as ester exchange catalysts. 1.58 parts (1.6 moles) of a 1% EG solution of amorphous germanium dioxide was added, and then 0.047 part (3.4 moles) of trimethyl phosphate was added to complete the ester exchange reaction. Thereafter, a polycondensation reaction

TABLE 1

|  | Amount of catalyst (mol/ton) | | | | | Prepolymer | | Characteristic properties of solid-state polymer | | | | Characteristic properties of bottle | |
| --- | --- | --- | --- | --- | --- | --- | --- | --- | --- | --- | --- | --- | --- |
|  | Co | Ca | Mg | P | Ge | Polymerization time (minutes) | [η] (dl/g) | [η] (dl/g) | Col-L/b | AA (ppm) | DEG (wt %) | COOH (eq/T) | Haze (%) | AA (ppm) |
| Ex. 1 | 0.2 | 0.8 | 2.0 | 3.4 | 1.6 | 70 | 0.50 | 0.65 | 83/−1.0 | 4.0 | 1.4 | 25 | 1.0 | 20 |
| Ex. 2 | 0.2 | 0.8 | 2.1 | 3.4 | 1.6 | 60 | 0.45 | 0.64 | 83/−1.5 | 2.4 | 1.5 | 20 | 1.1 | 18 |
| Ex. 3 | 0.6 | 0.8 | 2.1 | 4.9 | 2.5 | 71 | 0.50 | 0.71 | 80/−1.8 | 2.4 | 2.0 | 19 | 1.2 | 35 |
| Ex. 4 | 1.0 | 0.8 | 2.1 | 4.3 | 1.3 | 75 | 0.46 | 0.70 | 75/−4.0 | 1.8 | 1.8 | 17 | 1.1 | 30 |
| Comp. Ex. 1 | 0.6 | 0.8 | 2.1 | 3.9 | 0.9 | 130 | 0.62 | 0.76 | 70/5.0 | 9.6 | 0.7 | 37 | 5.6 | 50 |
| Comp. Ex. 2 | 0.1 | 0.8 | 2.1 | 3.4 | 1.6 | 72 | 0.51 | 0.54 | 84/0 | 40 | 0.6 | 38 | 6.0 | 57 |
| Comp. Ex. 3 | 0.1 | 0.8 | 2.1 | 3.4 | 1.6 | 71 | 0.50 | 0.54 | 83/0.5 | 35 | 3.5 | 37 | 6.3 | 60 |

Ex.: Example, Comp. Ex.: Comparative Example
In Tables 1 and 3, AA indicates the content of acetaldehyde, COOH the number of terminal carboxyl groups and DEG the content of diethylene glycol

TABLE 2

|  | Impact resistance (out of 10 bottles) | Alkali resistance | |
| --- | --- | --- | --- |
|  |  | Weight reduction (%) | Impact resistance |
| Example 1 | no broken bottles | 0.2 | no broken bottles |
| Comparative Example 1 | 4 broken bottles | 1.0 | 7 broken bottles |
| Comparative Example 2 | 8 broken bottles | 1.2 | 10 broken bottles |

EXAMPLE 5

100 Parts of dimethyl 2,6-naphthalenedicarboxylate and 51 parts of ethylene glycol (abbreviated as EG) were subjected to an ester exchange reaction in accordance with a commonly used method using 0.02 part (0.8 mole) of cobalt acetate tetrahydrate, 0.014 part (0.8 mole) of calcium acetate monohydrate and 0.044 part (2.1 moles) of magnesium was carried out under the conditions of a high temperature and at a high vacuum pressure in accordance with a commonly used method, and the reaction product was formed into strand-like chips. The intrinsic viscosity of the obtained prepolymer was 0.5 dl/g and the polymerization time was 70 minutes. This prepolymer was further polymerized in a solid state in accordance with a commonly used method. The obtained polymer had an intrinsic viscosity of 0.7 dl/g and an acetaldehyde content of 2 ppm.

EXAMPLES 6 to 9

Polymers were obtained in the same manner as in Example 5 except that the amounts and ratio of cobalt acetate tetrahydrate, magnesium acetate tetrahydrate, calcium acetate monohydrate, trimethyl phosphate and germanium dioxide were changed as shown in Table 3. The qualities and evaluation results of the obtained polymers are shown in Table 3.

TABLE 3

|  | Amount of catalyst (mol) | | | | | Ca + Mg | Mg/ Ca | P/(Co + Ca + Mg) | Prepolymer Polymerization time (minutes) | [η] (dl/g) | Characteristic properties of solid-state polymer | | | | | Characteristic properties of bottle | |
| --- | --- | --- | --- | --- | --- | --- | --- | --- | --- | --- | --- | --- | --- | --- | --- | --- | --- |
|  | Co | Ca | Mg | P | Ge |  |  |  |  |  | [η] (dl/g) | Col L/b | AA (ppm) | DEG (wt %) | COOH (eq/T) | Haze (%) | AA (ppm) |
| Ex. 5 | 0.6 | 0.8 | 2.1 | 3.8 | 1.6 | 2.9 | 2.6 | 1.1 | 70 | 0.50 | 0.70 | 81/−2.0 | 2.0 | 0.9 | 25 | 1.0 | 34 |
| Ex. 6 | 0.6 | 1.2 | 1.7 | 3.8 | 1.6 | 2.9 | 1.4 | 1.1 | 73 | 0.50 | 0.70 | 81/−2.1 | 2.4 | 1.4 | 24 | 1.1 | 33 |
| Ex. 7 | 0.6 | 0.8 | 2.1 | 4.9 | 2.5 | 2.9 | 2.6 | 1.4 | 60 | 0.50 | 0.70 | 80/−1.8 | 2.3 | 1.8 | 26 | 1.2 | 34 |
| Ex. 8 | 1.0 | 0.8 | 2.1 | 4.3 | 1.3 | 2.9 | 2.6 | 1.1 | 75 | 0.50 | 0.70 | 75/−4.0 | 2.5 | 2.0 | 24 | 1.1 | 34 |
| Ex. 9 | 0.6 | 0.8 | 2.1 | 3.8 | 1.6 | 2.9 | 2.6 | 1.1 | 70 | 0.50 | 0.74 | 80/−1.7 | 3.0 | 2.5 | 25 | 1.0 | 35 |

Ex.: Example
Comp. Ex.: Comparative Example

The polyethylene-2,6-naphthalene dicarboxylate of the present invention is excellent in hue, thermal stability and transparency, and provides a bottle product of high commercial product value, which is hardly whitened at the time of molding. Further, a bottle molded of this polyethylene-2,6-naphthalene dicarboxylate has properties suitable for use as a bottle which can be recycled.

What is claimed is:

1. A polyethylene-2,6-naphthalene dicarboxylate resin for molding a bottle, which comprises 2,6-naphthalenedicarboxylic acid as a main acid component and ethylene glycol as a main glycol component and contains a germanium compound as a polycondensation catalyst, and has an intrinsic viscosity of 0.55 to 0.75 dl/g, a terminal carboxyl group content of 32 eq/ton or less, an acetaldehyde content of 8 ppm or less and a diethylene glycol component content of 0.8 to 3.0 wt %.

2. The polyethylene-2,6-naphthalene dicarboxylate resin of claim 1, which has an intrinsic viscosity of 0.58 to 0.73 dl/g.

3. The polyethylene-2,6-naphthalene dicarboxylate resin of claim 1, which has a terminal carboxyl group content of 30 eq/ton or less.

4. The polyethylene-2,6-naphthalene dicarboxylate resin of claim 1, which has an acetaldehyde content of 6 ppm or less.

5. The polyethylene-2,6-naphthalene dicarboxylate resin of claim 1, which has a diethylene glycol component content of 1.0 to 2.8 wt %.

6. The polyethylene-2,6-naphthalene dicarboxylate resin of claim 1, which has a b value in the range of +0.6 to −6.0.

7. The polyethylene-2,6-naphthalene dicarboxylate resin of claim 1, which further contains a cobalt compound, a magnesium compound, a calcium compound and a phosphorus compound in amounts that satisfy the following expressions:

$$0.12 \leq Co \leq 1.2 \quad (1)$$

$$2.0 \leq Mg+Ca \leq 6.0 \quad (2)$$

$$1.3 \leq Mg/Ca \leq 6.0 \quad (3)$$

$$1.0 \leq P/(Co+Mg+Ca) \leq 1.5 \quad (4)$$

$$1.0 \leq Ge \leq 3.0 \quad (5)$$

wherein Co, Mg, Ca, P and Ge indicate the number of moles of cobalt atoms in the cobalt compound, the number of moles of magnesium atoms in the magnesium compound, the number of moles of calcium atoms in the calcium compound, the number of moles of phosphorus atoms in the phosphorus compound and the number of moles of germanium atoms in the germanium compound, based on 1 ton of acid components constituting the polymer, respectively.

8. The polyethylene-2,6-naphthalene dicarboxylate resin of claim 7, wherein the amount of the cobalt compound satisfies the following expression:

$$0.41 \leq Co \leq 1.2 \quad (1)'$$

wherein Co is the same as defined in the above expression (1).

9. The polyethylene-2,6-naphthalene dicarboxylate resin of claim 8, which has an acetaldehyde content of 5 ppm or less.

10. The polyethylene-2,6-naphthalene dicarboxylate resin of claim 7, which has a b value in the range of +0.6 to −6.0.

11. A preform for a bottle, which is formed from the polyethylene-2,6-naphthalene dicarboxylate resin of claim 1.

12. A bottle formed from the polyethylene-2,6-naphthalene dicarboxylate resin of claim 1.

* * * * *